United States Patent [19]

McCarville et al.

[11] Patent Number: 4,931,126

[45] Date of Patent: Jun. 5, 1990

[54] APPARATUS AND METHOD FOR JOINING A PLURALITY OF THERMOPLASTIC TAPES

[75] Inventors: Douglas A. McCarville; Jeffrey A. New, both of Wichita, Kans.

[73] Assignee: The Boeing Company, Seattle, Wash.

[21] Appl. No.: 338,183

[22] Filed: Apr. 14, 1989

[51] Int. Cl.$^5$ .................... B29C 65/00; B29C 65/08; B32B 31/04

[52] U.S. Cl. .................................. 156/304.6; 156/544

[58] Field of Search .............. 156/304.1, 304.6, 304.7, 156/544

[56] References Cited

U.S. PATENT DOCUMENTS

| | | | |
|---|---|---|---|
| 2,987,108 | 6/1961 | Kilmartin | 154/42.3 |
| 2,988,134 | 6/1961 | Nissel | 156/544 X |
| 3,065,121 | 11/1962 | Andrews | 156/544 X |
| 3,472,721 | 10/1969 | Abramson et al. | 156/366 |
| 3,654,043 | 4/1972 | Jacobi | 156/544 X |
| 4,050,972 | 9/1977 | Cardinal | 156/544 X |
| 4,557,790 | 12/1985 | Wisbey | 156/511 |
| 4,834,827 | 5/1989 | Obeda | 156/544 X |

FOREIGN PATENT DOCUMENTS

| | | |
|---|---|---|
| 502409 | 3/1939 | United Kingdom . |
| 1531435 | 5/1975 | United Kingdom . |

Primary Examiner—William A. Powell
Attorney, Agent, or Firm—Finnegan, Henderson, Farabow, Garrett & Dunner

[57] ABSTRACT

The present invention relates to a seaming apparatus a method for producing a continuous sheet of thermoplastic material having a predetermined width from a plurality of elongated thermoplastic tapes each having edges defining a transverse width less than the predetermined width and each tape being wound on a roll. The seaming apparatus comprising a frame having a seaming zone. A feed device is mounted on the frame for rotatably supporting a plurality of rolls in a predetermined relationship. An alignment mechanism is mounted on the frame for receiving the tapes from rolls thereof supported by the feed device and for guiding the tapes into the seaming zones along paths defining a predetermined transversely adjacent relationship when the edges of the tapes position adjacent one another form a contiguous area. Thermal heating elements are provided in the seaming zone for thermally joining the contiguous area of the tapes to form the contiguous sheet of thermoplastic material. A take-up roll is rotatably mounting on the frame for receiving the continuous sheet of thermoplastic material from the seaming zone.

13 Claims, 10 Drawing Sheets

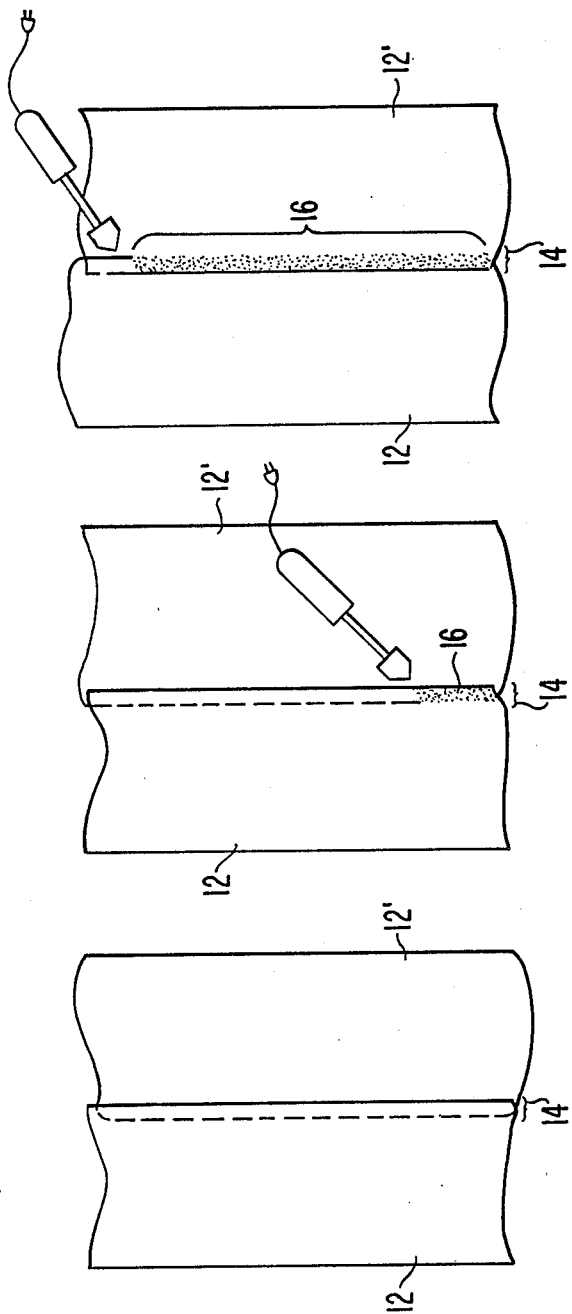

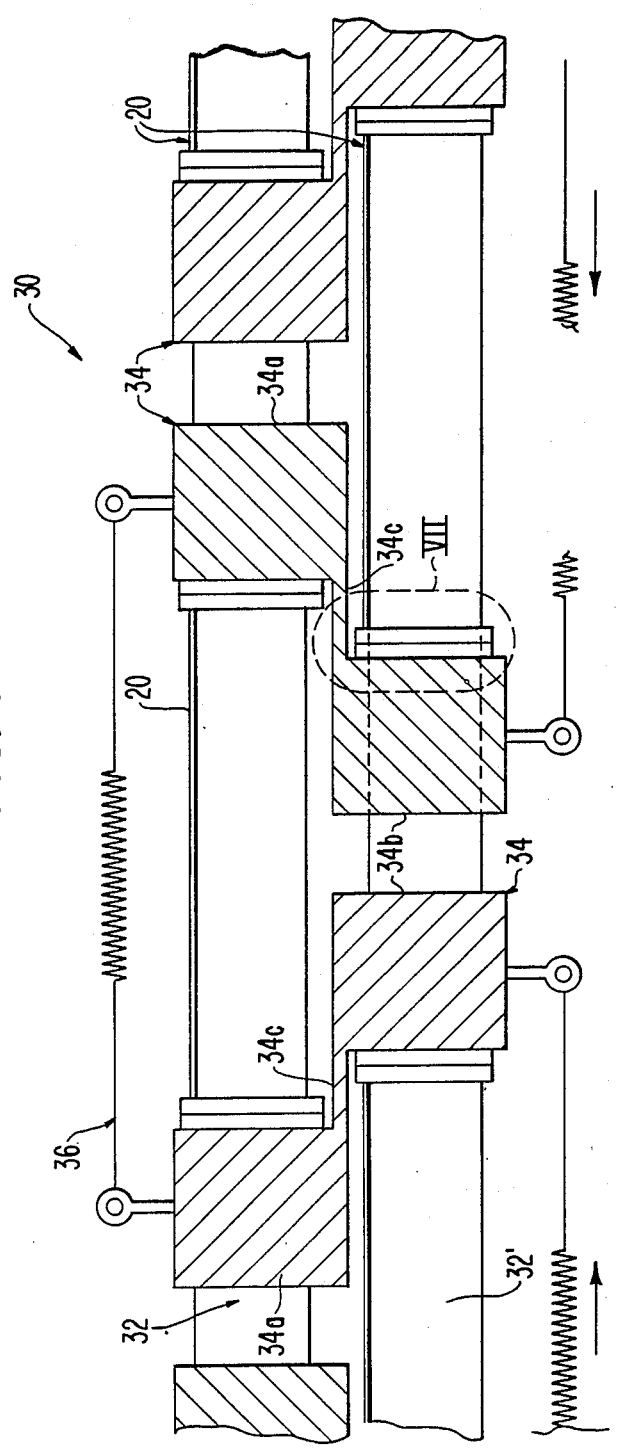

APPARATUS AND METHOD FOR JOINING A PLURALITY OF THERMOPLASTIC TAPES

FIELD OF THE INVENTION

The present invention relates to a method and apparatus for uniformly and rapidly joining a plurality of thermoplastic tapes of varying widths to produce a single continuous sheet of a desired width.

BACKGROUND OF THE INVENTION

Currently, thermoplastic tapes of a composite type material, such as a longitudinally reinforced thermoplastic resin, may be purchased in narrow widths typically of three to twelve inches. However, there are a variety of large scale thermoplastic processing technologies that require thermoplastic tapes having at least a sixty inch width. Machinery is needed to satisfactorily join narrow thermoplastic tapes together to generate a wide thermoplastic tape suitable for large scale thermoplastic technologies processing. Though apparatus has been proposed for simultaneously joining and laying down narrow tapes on fields used for sporting events, such is not suitable for achieving satisfactory seam structures usable in large scale thermoplastic technologies.

In order to obtain the necessary width, it has been the conventional practice to manually seam the individual tapes widths together. This is performed using hand held steaming irons. This antiquated method is time and labor intensive.

Hand seaming has not proven satisfactory because it requires an extensive amount of time to achieve the desired width. Hand seaming rates of less than 1 foot per minute are typical. Manual seaming is not reliable from a quality control standpoint as human variables inherent in manual manufacturing render the predictability of the material properties of the final tape impossible. Manual hand seaming permits fluctuation of variables affecting the final strength, namely, tape overlap, fiber orientation, appropriate pressure, heat application, and speed of operation.

The material characteristics of manually-made tape is difficult to predict because, among other things, inconsistent manual alignment of the individual tapes produces seam structures having nonuniform overlap. This is a problem because the angle and width of the overlap between adjacent narrow tapes is critical for predicting design strengths. Longitudinally reinforced thermoplastic tape is strongest in the lengthwise direction thus, the maximum strength of a seamed tape is attained when the individual narrow tapes are arranged in a precisely parallel relationship. Manual seaming methods and known machinery for seaming have not produced consistent seam overlap and alignment of the narrow thermoplastic tapes in a precisely parallel manner.

Manual seaming produces inconsistent seam quality due to erratic pressure and heat application. Consequently, inner fiber orientation is distorted causing a decrease in the final strength of the completed tape.

There are a variety of seam structures that cannot be readily produced with a manual seaming process and have not been attainable with known machine apparatus. In contrast, the present invention provides seam structures such as overlap, overlap mesh and butt. The present invention also provides for continuous or spot seaming.

Finally, hand seaming is inadequate as it renders the production of completed tape having widths greater than two feet virtually impossible because of the difficulty in manually reaching beyond two feet absent the use of a machine set up.

FIGS. 1A-1C show the conventional manual seaming procedure. In FIG. 1A individual plies of narrow tapes 12 and 12' are placed adjacent to one another and positioned to overlap one another in a consistent parallel fashion. As shown in FIG. 1B, heat and pressure are applied to the overlap region 14 of the individual narrow tapes 12 and 12' to melt fuse the individual tapes to one another in a seamed region 16. As shown in FIG. 1C, the manual seaming procedure requires an awkward final advancement step wherein either the tape material itself is moved to a subsequent tape section to be seamed or the seaming apparatus itself is extended to a subsequent tape section.

Conventional methods and apparatus, in contrast to the present invention, do not provide for the engineering of a particular seam structure and the maximization of the strength of the completed tape. The typical seaming methods and apparatus are not concerned with the final strength of the film. Considering the variables affecting the mechanical properties of the seamed tape, namely, the interrelationship of the kind of thermoplastic tape utilized, the variety of seam structures attainable, and the method of seaming, the present invention provides an apparatus and method for monitoring and controlling these variables to allow for the engineering of the final product. Additionally, the present invention provides an apparatus and method for joining thermoplastic tapes in an efficient and economic manner.

The present invention efficiently combines individual tapes of a composite material using a selected seam construction to produce a final tape of the desired width having superior strength. The present invention, unlike the conventional seaming apparatus and methods, allows the selection of a variety of seam constructions wherein the respective individual tapes are arranged and secured in a precisely and uniformly parallel manner.

Additional advantages of the present invention are set forth in the following detailed description, and will be obvious from the description or may be learned by practice of the invention. The advantages of the present invention will be realized and attained by means of the elements and combinations of elements present in the appended claims.

SUMMARY OF THE INVENTION

The present invention, as embodied and broadly described therein, comprises a seaming apparatus for producing a continuous sheet of thermoplastic material having a predetermined width from a plurality of elongated thermoplastic tapes each having edges defining a transverse width less than the predetermined width and each tape being wound on a roll. The seaming apparatus further comprises a frame having a seaming zone. A feed means is mounted on the frame for rotatably supporting a plurality of rolls in a predetermined relationship. An alignment means is mounted on the frame for receiving the tapes from rolls thereof supported by the feed means and for guiding the tapes into the seaming zone along paths defining a predetermined transversely adjacent relationship wherein the edges of the tapes positioned adjacent one another form a contiguous area. Thermal means is provided in the seaming zone for thermally joining the contiguous areas of the tapes to form the continuous sheet of thermoplastic material A take-up roll means is rotatably mounted on the frame for receiving the continuous sheet of thermoplastic material from the seaming zone. A drive means is provided for rotating the take-up roll means to move the tapes through the seaming apparatus.

Also in accordance with the present invention is a seaming method of producing a continuous sheet of thermoplastic material of a selected width from thermoplastic tapes wound on a plurality of rolls comprising the following steps. Rotatably mounting the rolls of tapes on a frame. Threading the tapes through an alignment means for aligning the tapes in a selected one of an abutting seam structure and an overlapping seam structure. Using a driving means for applying tension to the tapes to feed the tapes at a constant speed into a seaming zone. Applying a specific amount of pressure on the tapes responsive to the material composition of the tapes and the seaming operation speed. Thermally joining the tapes to form a continuous sheet of thermoplastic material. Winding the continuous sheet of thermoplastic material on a take up roll means controllable by the drive means.

Additional advantages of the present invention are set forth in the following detailed description, and will be obvious from the description or may be learned by practice of the invention. The advantages of the present invention will be realized and attained by means of the elements and combinations of elements present in the appended claims.

BRIEF DESCRIPTION OF THE DRAWINGS

The accompanying drawings, which are incorporated in and constitute a part of this specification, illustrate several embodiments of the present invention and together with the description, serve to explain the principles of the present invention.

FIGS. 1A-C are perspective views of the steps used in the conventional manual seaming process;

FIG. 6 is a front view of the alignment mechanism of the seaming apparatus of the present invention taken from the direction of arrow VI in FIG. 5;

DETAILED DESCRIPTION OF THE PREFERRED EMBODIMENTS

Figure 2A:
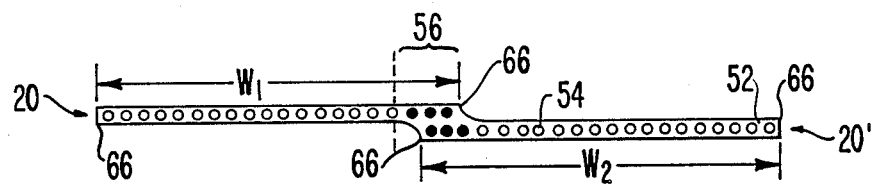
FIGS. 2A-C are cross sectional views of the overlap, overlap mesh and butt seam structures of the present invention.

The present invention is directed to a seaming apparatus for producing a continuous sheet of thermoplastic material having a predetermined width from a plurality of elongated thermoplastic tapes each having edges defining a transverse width less than the predetermined width and each tape being wound on a roll. As shown in FIGS. 2-5, the invention provides a seaming apparatus for producing a continuous sheet of thermoplastic material 18 having a predetermined width from a plurality of elongated thermoplastic tapes 20 wound on rolls 28. Each tape 20 has edges 66 defining a transverse width $W1$, $W2$ which is less than the width of the continuous sheet of thermoplastic material 18.

Figure 3A:
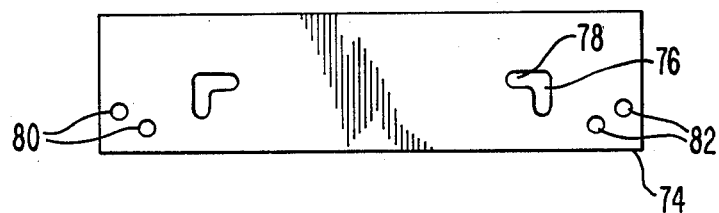
FIG. 3A is a side view of the side plate of the present invention.
Figure 3:
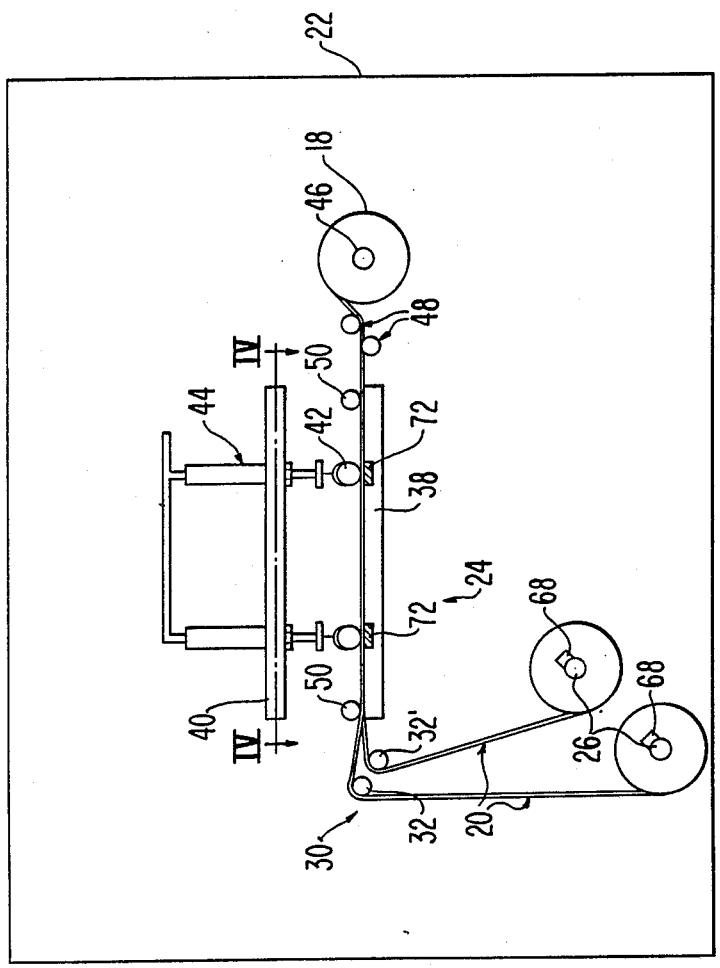
FIG. 3 is a side view of the seaming apparatus of the present invention.
Figure 4:
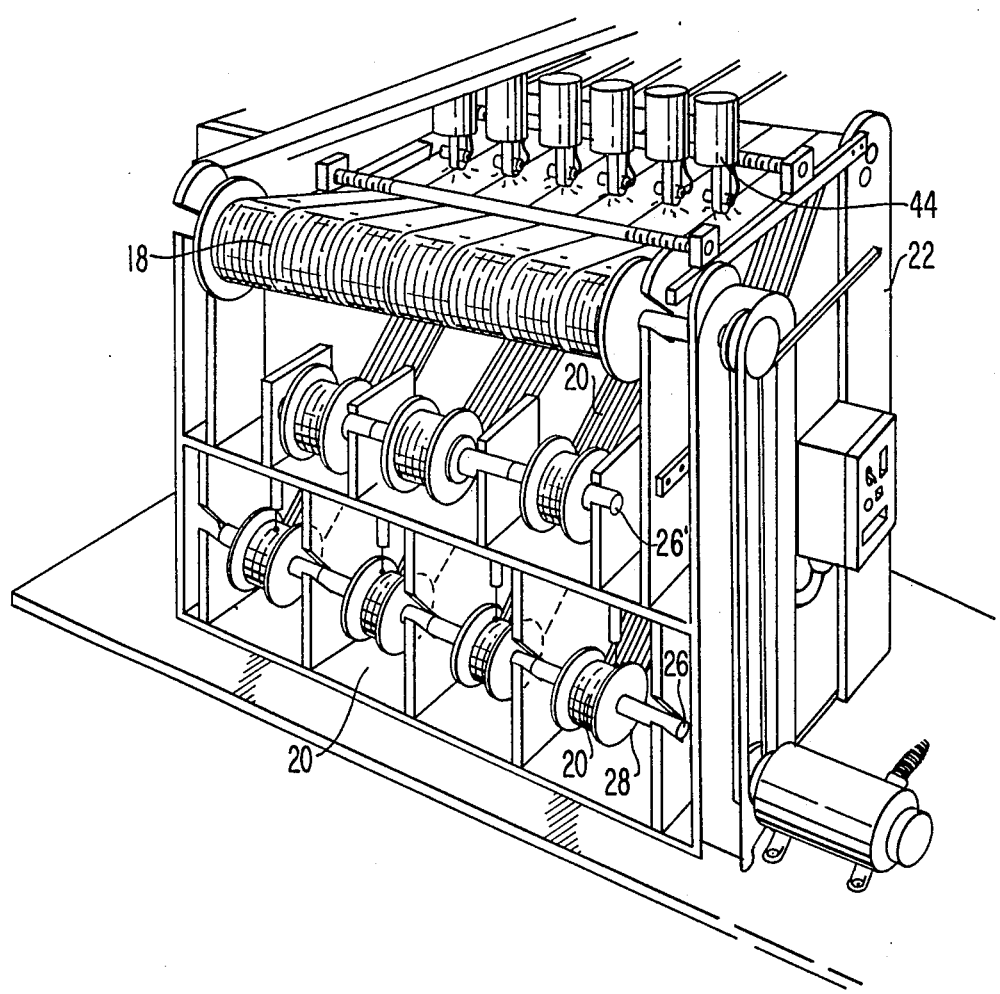
FIG. 4 is a perspective view of another embodiment of the seaming apparatus of the present invention.

In accordance with the invention, the seaming apparatus comprises a frame having a seaming zone. As shown in FIGS. 3 and 4, frame 22 is provided for supporting the components of the seaming apparatus. The frame includes front and back areas on opposite sides of a seaming zone generally referred to as reference number 24. Seaming zone 24 is subsequently described in detail.

Figure 5:
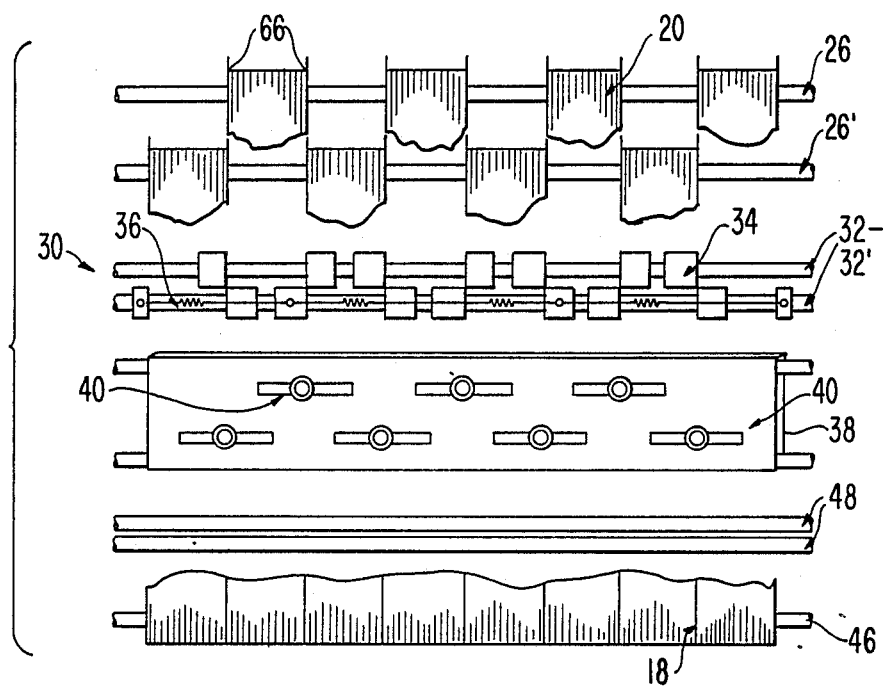
FIG. 5 is a top plan view of the seaming apparatus of the present invention.

In accordance with the invention, the seaming apparatus also includes feed means mounted on the frame for rotatably supporting a plurality of the rolls in a predetermined relationship. As embodied herein and depicted in FIGS. 3-5, the feed means comprises two feed shafts 26 arranged parallel to one another and mounted on frame 22 for rotatably supporting a plurality of rolls 28 in a predetermined relationship. As shown in FIGS. 4 and 5, two feed shafts 26 and 26' are disposed to receive and rotatably support a plurality of rolls 28 in a predetermined axially spaced relationship. Specifically, rolls 28 on first shaft 26 are in staggered alignment with rolls 28 on the second feed shaft 26'.

Preferably, means is provided for adjusting the axial spacing between rolls 28 on feed shafts 26 so that the axial spacing on one shaft generally corresponds with the width of tapes 20 located on the other shaft. A resistance mechanism 68 (FIG. 3) operable in conjunction with feed shafts 26 may be employed to effect a predetermined tension on tapes 20 during movement through the seaming apparatus.

In accordance with invention, the seaming apparatus comprises alignment means mounted on the frame for receiving the tapes from rolls thereof supported by the feed means and for guiding the tapes into the seaming zone along paths defining a predetermined transversely adjacent relationship wherein the edges of the tapes positioned adjacent one another form a contiguous area. In the embodiment depicted in FIGS. 5-8, the alignment means, generally designated as reference number 30, is mounted on the frame 22 to receive the tapes 20 from the rolls 28. Alignment means 30 controls and monitors the location of edges 66 of each tape 20 with respect to edges 66 of adjacent tapes 20. Alignment means 30 guides tapes 20 into seaming zone 24 along specific paths. The paths define a predetermined transversely adjacent relationship wherein edges 66 of tapes 20 are positioned adjacent to one another to form a contiguous area.

As shown in FIGS. 5 and 6, alignment means 30, as embodied herein, comprises two parallel guidance shafts 32 and 32' rotatably mounted on frame 22 in parallel relation to feed shafts 26 and 26'. Guidance shafts 32 and 32' slidably support a plurality of linear guidance elements 34. Linear guide elements 34 are configured and disposed to adjustably define paths for positioning the movement of tapes 20 through the seaming apparatus.

Preferably, each linear guide element 34 is Z-shaped having top 34a, bottom 34b and center 34c portions. Each top 34a and bottom 34b portion of each element 34 is slidably disposed on a respective one of guidance shafts 32 and 32'. Center portion 34c extends between guidance shafts 32 and 32' fixedly connecting top and bottom portions 34a, 34b. Because of this configuration, one linear guide element 34 affects the movement of the tapes 20 disposed on both of the two parallel guidance shafts 32 and 32'. As a result, a correlation may be achieved between the position of the tapes on one parallel guidance shaft with respect to the position of the tapes on the other parallel guidance shaft.

As shown in FIG. 6, two linear guide elements 34 cooperate to define the boundaries of a path for controlling the traveling position of tapes 20 through the seaming apparatus. The paths are defined by the gaps between adjacent portions of linear guide elements 34 on each shaft. The parameters of each path may be varied by sliding the linear guide elements 34 along parallel guidance shafts 32, 32 .

As shown in FIG. 6 in one embodiment, tensioning means, springs 36, are provided for applying a force to bias adjacent portions of linear guide elements 34 toward one another. Due to the interconnection of portions 34a, 34b of each element on the two shafts, variations in tape width are accommodated to maintain generally constant the transversely adjacent relationship of edges 66 of tapes 20.

Figure 9:
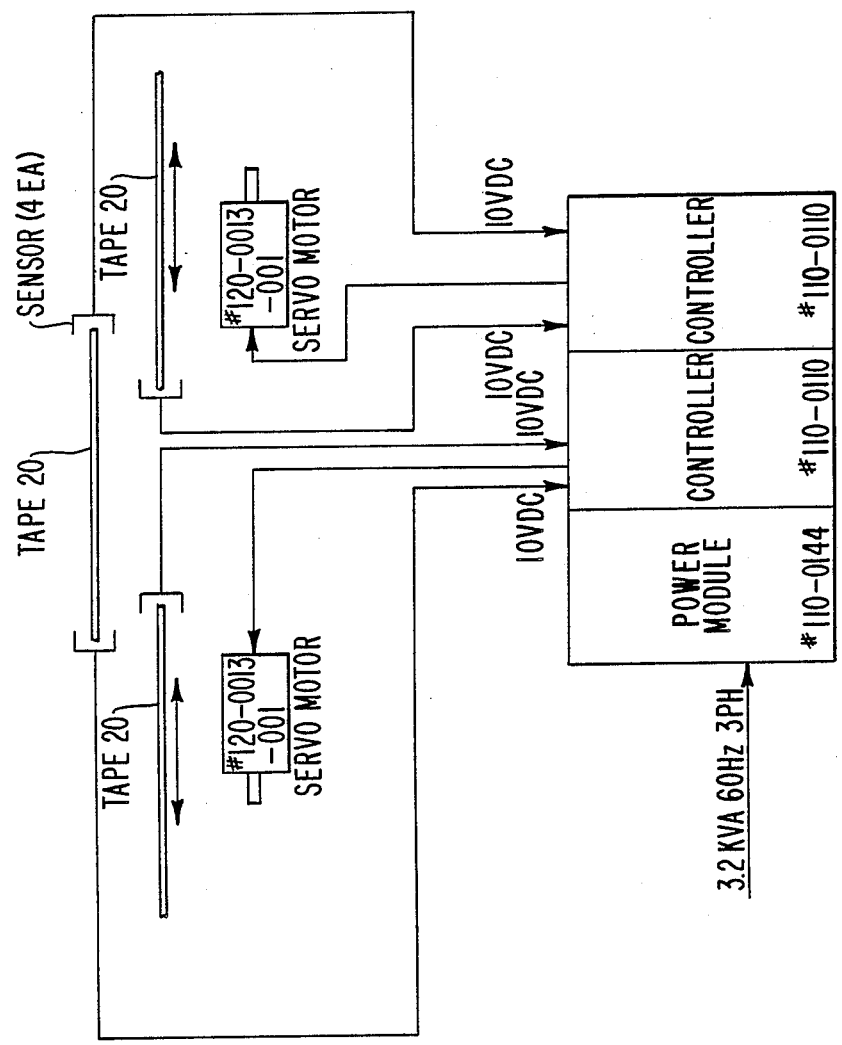
FIG. 9 is a schematic representation of the sensing and adjustment controls of the alignment mechanism of the present invention.

The present invention contemplates, as an alternate to springs 36, sensing controls (not shown) for measuring the width of the individual tapes and a control system for moving elements 34 in response to the tape width to maintain constant transverse relationship. FIG. 9 shows a schematic of the sensing and adjustment controls that can be used with the alignment mechanism of the present invention.

Figure 7:
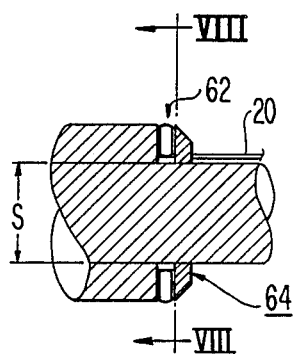
FIG. 7 is a cross-sectional view of the linear guide element of the present invention identified by circle VII of FIG. 6.
Figure 8:
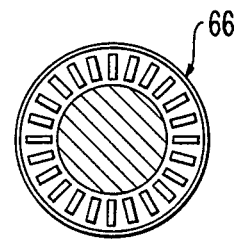
FIG. 8 is a cross sectional view of the feed shaft and linear guide element of the present invention taken along line VIII—VIII of FIG. 7.

Preferably, as shown in FIGS. 7 and 8, thrust bearings 62 are disposed on top and bottom portions 34a, 34b of guide elements 34 coaxial with parallel guidance shafts 32, 32'. Thrust washers 64 may be provided to ride against thrust bearings 62. Thrust washers 64 can rotate freely to permit tapes 20 to pass between and be guided by elements 34 with reduced friction.

Referring to seaming zone 24, the present invention preferably includes lower seaming deck 38 and upper seaming deck 40. Lower seaming deck is disposed to support tapes 20 during passage through seaming zone 24. As discussed in more detail below, tapes 20 are joined by heat and pressure imposed on the contiguous edges thereof. To reduce heat loss and friction at the locations of heat and pressure application, lower seaming deck 38 preferably includes removable insert 72 disposed where the heat and pressure is applied. Inserts 72 are subject to wear during use, thus the periodic replacement of such allows for the maintenance of seam quality without replacement of the entire lower seaming deck 38.

As depicted in FIG. 3, leveling bars 50 are preferably disposed at opposite ends of lower seaming deck 38 to hold tapes 20 onto the surface of lower seaming deck 38 during passage through seaming zone 24. Bars 50 may be engaged at their ends in vertical L-shaped slots 76 in side plates 74 (FIG. 3A) which permit bars 50 to freely move vertically to adjust themselves during tape passage. The horizontal portion 78 of L-shaped slots 76 provide a means for supporting bars 50 above lower deck 38 while threading tapes 20 through seaming zone 24. In the preferred embodiment, side plates 74 also include holes 80 at one end for supporting shafts 32, 32' of the alignment means. Holes 82 in the other end of side plates 74 support output guidance shafts 48 disposed between seaming zone 24 and take-up roll 46, discussed below. Guidance shafts 48 maintain the seamed thermoplastic sheet 18 in the plane of lower seaming deck 38 for even take-up on roll 46.

Figure 10:
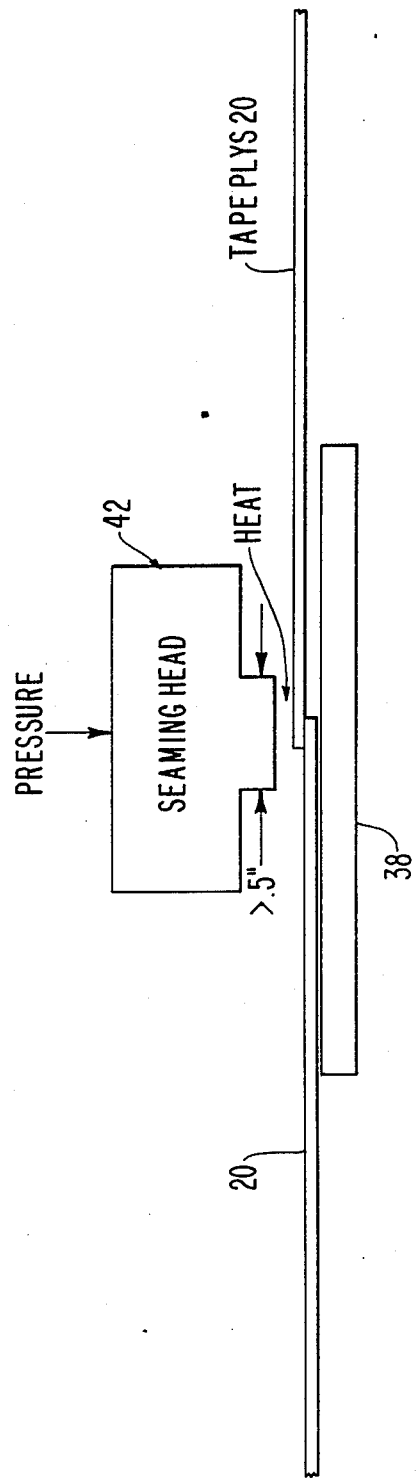
FIGS. 10 and 11 are side views of the seaming zone of the present invention.
Figure 11:
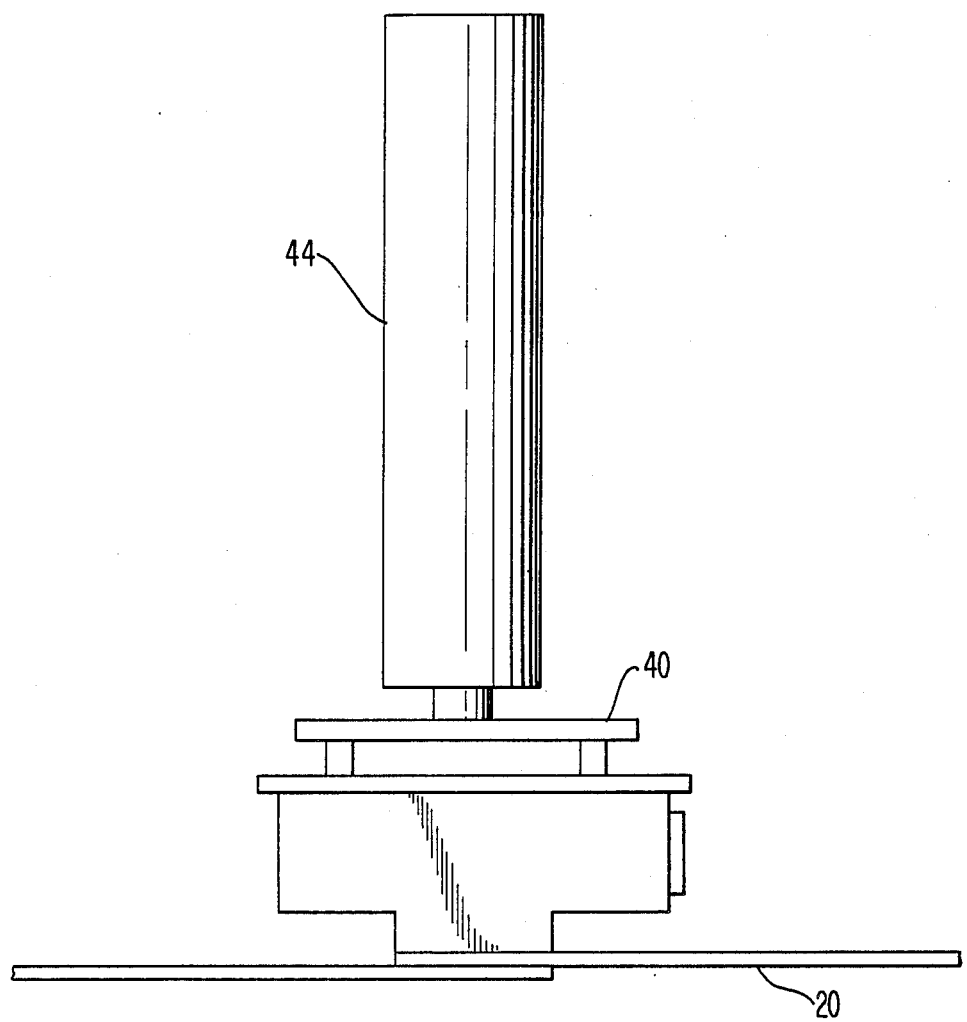

In accordance with the invention, thermal means is provided in the seaming zone for thermally joining the contiguous areas of the tapes to form the continuous sheet of thermoplastic material 18. As shown in FIGS. 10 and 11, the thermal means as embodied herein includes a multiplicity of flat heat seaming heads 42 disposed to engage contiguous edges of tapes 20 riding on the surface of lower seaming deck 38. Flat seaming heads 42 may be operable in conjunction with a temperature regulating system to maintain a desired set point temperature which can be set and controlled depending on the type of thermoplastic resin material utilized. Alternatively, flat seaming heads 42 may be individually controlled to maintain the optimal temperature required for a given material at a given seaming speed.

The invention contemplates employing thermocouple wire placed on each flat seaming head 42 to read the temperature thereof and transfer such data to a temperature display and set point mechanism (not shown). The temperature display and set point mechanism may compare the input data to the set point temperature which relays a signal to a controller (not shown). The controller may energize or de-energize the seaming head calrods in accordance with the temperature mechanism to maintain a seam temperature to within ±10° F.

Preferably, pneumatic cylinders 44 supported by upper seaming deck 40 are disposed in seaming zone 24 to selectively apply a given pressure through flat seaming heads 42 to the seams to effect the joining of tapes 20. Pneumatic cylinders 44 apply a particular pressure to tapes 20 depending upon the tapes' material composition, dimensions and the operating speed of the seaming apparatus. Pneumatic cylinders 44 are preferably positioned above the contiguous area of adjacent tapes 20. To prevent heat damage to pneumatic cylinders 44 from the heat of flat seaming heads 42, flat seaming heads 42 may be spaced from pneumatic cylinders 44 by means of phenolic heat sinks (not shown).

Figure 12A:
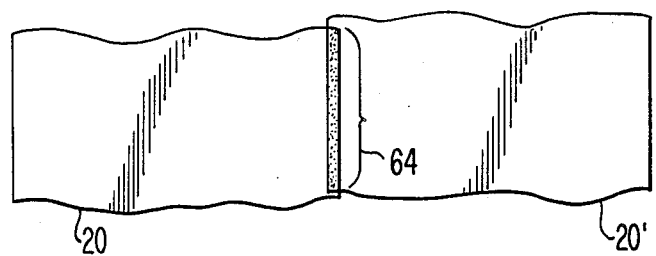
FIGS. 12A-B are plan views of the continuous and spot seaming structures, respectively, of the present invention.
Figure 12B:
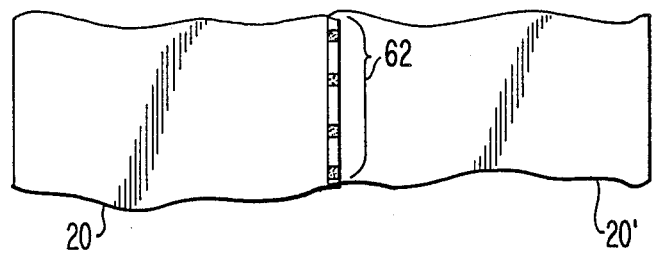

The invention contemplates the use of an oscillator (not shown) in conjunction with pneumatic cylinders 44 to provide for discontinuous seaming by cycling pressure on flat seaming heads 42. As a result, spot seaming 62 as depicted in FIG. 12B is possible in contrast to the continuous seam 64 shown in FIG. 12A resulting from continuous pressure. The spot seaming capability of the invention is beneficial in that it minimizes seaming head heat loss and allows for faster seaming speeds. Preferably, means for adjusting the length and time between the cycles can be utilized.

In accordance with the invention, take-up roll means is rotatably mounted on the frame to receive the continuous sheet of thermoplastic material from the seaming zone. In the embodiment shown in FIG. 3, take-up rolls means 46 is mounted on the end of the seaming apparatus opposite to the feed shafts 26. FIG. 4 shows another embodiment wherein the feed shafts 26 and take-up roll means 46 are mounted on the same end of the seaming apparatus and tapes 20 are fed through the frame to enter the seaming zone on one side and exit on the other.

In accordance with the invention, drive means is provided for rotating the take-up roll means to move the tapes through the seaming apparatus. As embodied herein, the drive means includes means for selectively varying the speed of rotation of take-up roll means 46 to move tapes 20 across the lower seaming deck 38 at a constant linear speed. The seaming apparatus may operate at seaming speeds in the range of 10–100 ft/min.

Figure 2B:
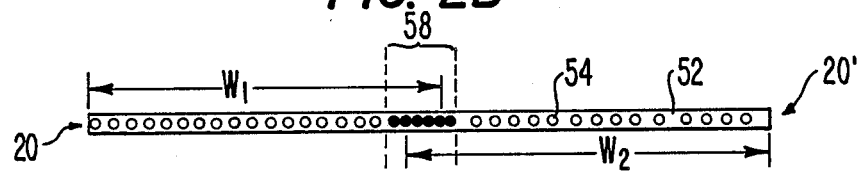
Figure 2C:
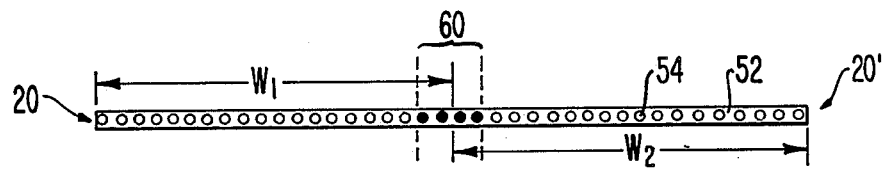

FIGS. 2A–2C depict cross-sectional views of thermoplastic sheets 18 incorporating different seam structures formed by use of the present invention. Specifically, the seaming apparatus may be used to seam, among other materials, composite thermoplastic tapes made of high temperature thermoplastic resin 52 having reinforcements 54 centrally embedded and extending along the longitudinal length of the tape material. Reinforcement 54 may be composed of, for example, graphite, glass and/or fibers depending on the desired material characteristics. The present invention, by providing a uniformly parallel seam structure, retains the maximum strength value of the combination of individual tapes in the final material construction. At least three types of seam constructions may be formed by the present invention. FIG. 2a depicts a first tape 20 having a first width $W_1$ and a second tape 20' having second width $W_2$ being joined by an overlap seam structure 56. FIG. 2b shows a modified overlap seam or an overlap meshed seam structure 58. Finally, FIG. 2c depicts a further seam embodiment wherein the first tape 20 and a second tape 20' are placed in edge abutting relationship to one another prior to melt fusing to form a butt seam structure 60.

The present invention contemplates a seaming method for producing a continuous sheet of thermoplastic material 18 of a selected width from thermoplastic tapes 20 wound on a plurality of rolls 28. Rolls 28 of tapes 20 are rotatably mounted on shafts 26, 26' in a predetermined relationship. Tapes 20 are threaded through alignment means 30 to align the tapes in a selected one of an abutting seam structure and an overlapping seam structure. Thereafter, tapes 20 are threaded through seaming zone 24 and onto take-up roll 46. A driving means for selectively rotating roll 46 and, resistance mechanism 68 on shafts 26, 26' are used to apply the proper tension on tapes 20 to feed the tapes at a constant speed into seaming zone 24 and to wind the tape on the take-up roll 46. Tapes 20 are thermally joined by use of flat heat seaming heads 42 that contact contiguous tape surfaces travelling through the seaming zone 24. Pressure applied by pneumatic pressure cylinders 44 and heat from flat seaming heads 42 effect seaming of tapes 20 to form continuous sheets 18. The heat and pressure are selectively applied in response to tape material's composition and dimensions and the operating speed of the seaming apparatus.

Other embodiments of the present invention will be apparent to those skilled in the art from consideration of the specification and practice of the disclosed invention. Use of the specification and examples are exemplary only, with the true scope and spirit of the invention being represented by the following claims.

What is claimed is:

1. A seaming apparatus for producing a continuous sheet of thermoplastic material having a predetermined width from a plurality of elongated thermoplastic tapes each having edges defining a transverse width less than the predetermined width an each tape being wound on a roll, comprising:
    a frame having a seaming zone;
    feed means mounted on said frame for rotatably supporting a plurality of the rolls in a predetermined relationship;
    alignment means mounted on said frame for receiving the tapes from rolls thereof supported by said feed means and for guiding the tapes into said seaming zone along paths defining a predetermined transversely adjacent relationship wherein the edges of the tapes positioned adjacent one another form a contiguous area;
    thermal means in said seaming zone for thermally joining the contiguous areas of said tapes to form the continuous sheet of thermoplastic material;
    take-up roll means rotatably mounted on said frame to receive the continuous sheet of thermoplastic material from said seaming zone; and
    drive means for rotating said take-up roll means to move the tapes through said seaming apparatus.

2. The seaming apparatus according to claim 1, wherein said feed means comprises first and second feed shafts arranged parallel to one another and disposed to receive a plurality of the rolls in an axially spaced relationship wherein the rolls on said first feed shaft are in staggered alignment with the rolls on said second feed shaft and wherein the axial spacing between rolls on each of said first and second feed shafts are adjustable to generally correspond with the width of the tapes on the rolls disposed on the other of said first and second feed shafts.

3. The seaming apparatus according to claim 2, wherein said alignment means comprises first and second parallel guidance shafts rotatably mounted to said frame in parallel relation to said first and second feed shafts, said first and second parallel guidance shafts slidably supporting a plurality of linear guidance elements disposed to define the paths of said tapes received from said first and second feed shafts.

4. The seaming apparatus according to claim 3, further including means responsive to the width of each of the tapes for moving said linear guidance elements to maintain said predetermined transversely adjacent relationship.

5. The seaming apparatus according to claim 1, wherein said thermal means includes means for selectively functioning in a continuous and alternating fashion to provide uniform and spot joining, respectively.

6. The seaming apparatus according to claim 1 wherein said thermal means includes a multiplicity of flat heat seaming heads operable in conjunction with a temperature regulating system to maintain a desired set point temperature.

7. The seaming apparatus according to claim 1, also including pneumatic cylinders in said seaming zone and disposed to selectively apply pressure on said contiguous areas during joining in said seaming zone.

8. The seaming apparatus according to claim..1, wherein said seaming zone includes a seaming deck and said drive means includes means for selectively varying the speed of rotation of said take-up means to effect constant linear speed of movement of the tapes across said seaming deck.

9. The seaming apparatus according to claim 1 wherein said frame includes front and back areas on opposite sides of said seaming zone, said feed means being mounted at said front area, said take-up roll means being mounted at said back area and said alignment means being positioned above said feed means.

10. The seaming apparatus according to claim 1, wherein said feed means includes means for selectively resisting removal of the tapes from the rolls to effect a predetermined tension on the tapes during movement through said seaming apparatus.

11. The seaming apparatus according to claim 1, wherein said alignment means is adjustable to define said contiguous area by abutting or overlapping relationship of adjacent tape edges.

12. A seaming apparatus according to claim 1, wherein said thermoplastic tapes are made of resin embedded with longitudinal reinforcements.

13. A seaming method of producing a continuous sheet of thermoplastic material of a selected width from thermoplastic tapes wound on a plurality of rolls, comprising the steps of:
    rotatably mounting the rolls of tapes on a frame;
    threading the tapes through an alignment means for aligning the tapes in a selected one of an abutting seam structure and an overlapping seam structure;
    using a driving means for applying tension to the tapes to feed the tapes at a constant speed into a seaming zone;
    applying a specific pneumatic pressure on the tapes responsive to the material composition of the tapes and the seaming operation speed
    thermally joining the tapes to form the continuous sheet of thermoplastic material; and
    winding the continuous sheet of thermoplastic material on a take-up roll means controllable by said driving means.

* * * * *